Jan. 11, 1944.   L. PROVENCHER   2,339,190
TAPE LIFTING DEVICE AND SPINDLE BRAKE MECHANISM
Filed April 29, 1943   2 Sheets-Sheet 1

INVENTOR
LIONEL PROVENCHER
By
ATTORNEY

Jan. 11, 1944.       L. PROVENCHER       2,339,190
TAPE LIFTING DEVICE AND SPINDLE BRAKE MECHANISM
Filed April 29, 1943        2 Sheets-Sheet 2

INVENTOR
LIONEL PROVENCHER
By
ATTORNEY

Patented Jan. 11, 1944

2,339,190

UNITED STATES PATENT OFFICE 2,339,190

TAPE LIFTING DEVICE AND SPINDLE BRAKE MECHANISM

Lionel Provencher, Drummondville, Quebec, Canada, assignor to Drummondville Cotton Company Limited, Montreal, Quebec, Canada, a corporation of Canada Application April 29, 1943, Serial No. 485,063
In Canada December 4, 1942

7 Claims. (Cl. 57—88)

Introduction

This invention relates to textile machinery, in particular to a mechanism for simultaneously lifting the driving tape of a twister spindle and applying braking pressure to the spindle.

It is common practice to drive four spindles from the same tin cylinder with a common driving tape which engages the whorl of each spindle. Braking devices are usually provided to stop one or other of the spindles to the exclusion of the other three. This is generally effected by merely braking the spindle and allowing the tape to slip over the whorl. The frictional resistance of the whorl on the tape has the effect of slowing it up and consequently of reducing the speed of the other three spindles.

Objects

It is a principal object of the present invention to provide in a mechanism in which several spindles are driven by the same tape, means for stopping one spindle without reducing the speed of the others. It is a more specific object to provide means for removing the tape from contact with the spindle which is being stopped. It is a further object to provide in a mechanism of this nature, means for retaining the tape away from the spindle and braking the spindle at one and the same time.

The invention

With these and other objects in view, the invention is embodied in a preferred arrangement in which a bracket is mounted adjacent the spindle, the bracket including a guideway, a runner adapted to follow the guideway, a roller on the runner to engage the tape. The guideway is so directioned as, in operative positions, to remove the tape from the spindle as the runner moves along the guideway and in one operative position to exert braking pressure on the spindle and in another operative position to retain the tape and runner clear of the spindle whereby the spindle may be removed from its base.

Drawings

The invention will now be further explained by reference to a preferred apparatus in which it is embodied, shown in the accompanying drawings, in which.

Detailed description

Figure 1:
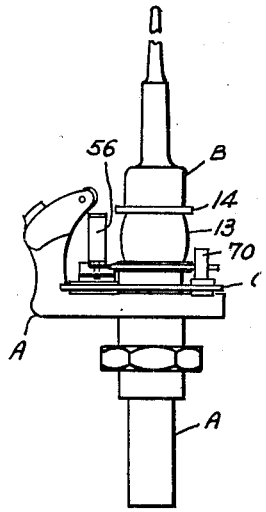
Figure 1 is a side elevation showing a spindle base with a mechanism according to the present invention mounted thereon adjacent the spindle.

Referring more particularly to the drawings, the figures illustrate one of the right-hand spindles as viewed from the front of the twister frame. It will be understood that the left-hand spindles will be equipped with similar mechanism, but that the operation of the "left-hand" mechanism, as will be clear from the following, will be in the opposite direction.

A represents the spindle base on which is mounted for rotation the spindle B. The spindle whorl is indicated by 13 and the flanges by 14. This structure is conventional.

According to a characteristic embodiment of the invention, there is mounted on the base A beneath the spindle, a plate C. This plate is provided with a circular clamp 23 adapted to surround the circular portion of the base A and thus secure the plate to the base below the spindle. The clamp is tightened by means of a set screw 24.

The plate also includes a lateral extension or platform 20 as illustrated in the drawings. This platform includes a substantially arcuate slot 31 concentric with the spindle and branching at one end into terminals 35 and 36. The terminal 35 is short and extends inwards towards the spindle. The terminal 36 is slightly longer and extends diagonally outwards from the spindle.

Mounted on the platform 30 so as to be slidable along the slot 31 is a runner D, including top and bottom retaining plates 45 and 46 respectively, connected by guides 48 and 49 extending through the slot 31. On the top plate 45 is mounted an upstanding substantially U-shaped bracket having horizontal arms 50 and 52 connected by a vertical web 51. Mounted on the arm 52 is a vertical stud 55. On the stud 55 is carried for free rotation, a roller 56. The top of the stud 55 is provided with a washer and split pin 57 holding the roller in place. The inner face of the web 51 is provided with a lining 58 of leather or other suitable brake-lining material held in place by screws 59. From the outer face of the web 51 extends a fork 60 between the prongs of which extends a pin 61. The end of a lever 63 is rotatably pinned to the fork 60 by the pin 61.

Mounted for free rotation on an extension of the platform 20 and anchored thereto by a pin 73 is an upstanding stud 70. This stud includes a transverse hole 72 through which the body of the lever 63 slides as will be clear from the drawings. The outer end of the lever 63 is provided with a loop 64 serving as a handle. A set screw 75 working axially in the stud is used to increase or lessen the freedom of the lever 63 to slide through the hole 72.

The arrangement described is for use on right-hand spindles (of the 4 driven by the same tape). Similar plates, but with platforms and mechanism at the opposite side (permitting clockwise (looking down) movement of the runner into operative position) are applied to the left-hand spindles. In other words, there will be two right and two left-hand mechanisms of the above description for every four spindles driven by the same tape.

Operation

Figure 2:
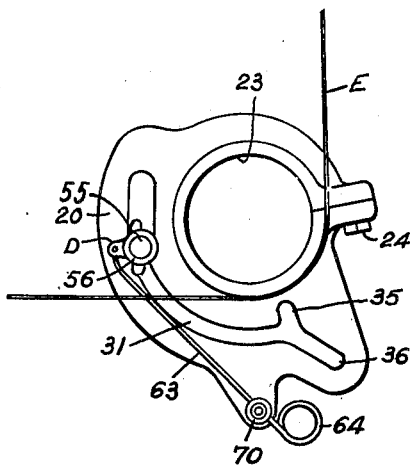
Figure 2 is a plan view of the bracket or plate carrying the mechanism of the present invention with the runner shown in an "inoperative" position, the driving tape also being indicated in the position it would assume when driving the spindle. The spindle and its base have been omitted to clarify the view.

Each mechanism is applied to its spindle by fitting the plate 23 over the lower portion of its respective spindle base and clamping it in position. Any other suitable arrangement could be employed for positioning the mechanism adjacent the spindle. When all four spindles are being driven, the sliders D are placed in the inoperative position, shown in Figure 2, i. e. at the extreme left-hand end of the slot 31. With the left-hand spindles, of course, their position is reversed, i. e. at the extreme right-hand end of the corresponding slot.

The spindle tape is then placed about the driving cylinder and about the respective spindles and the twister frames operated as usual. When it is desirable to stop a spindle without disturbing the others driven by the same tape, the following is the procedure.

Figure 3:
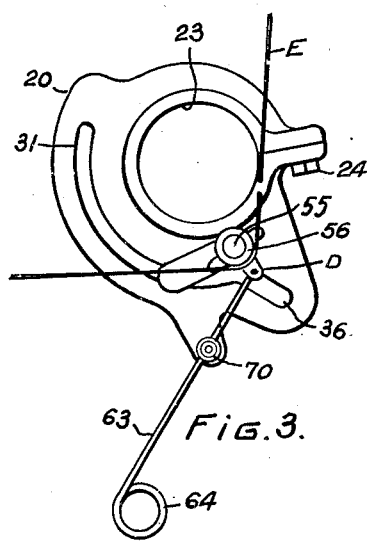
Figure 3 is a plan view of the bracket, plate and mechanism shown in Figure 2, but this time with the runner in the "braking" position. The position, which the tape assumes when the runner is in this position, is also illustrated.
Figure 4:
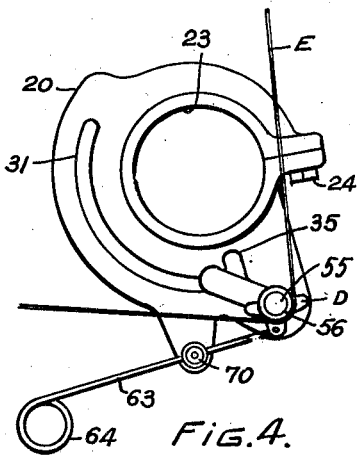
Figure 4 is a view similar to Figures 2 and 3, but this time the runner is in the "spindle removal" position.
Figure 5:
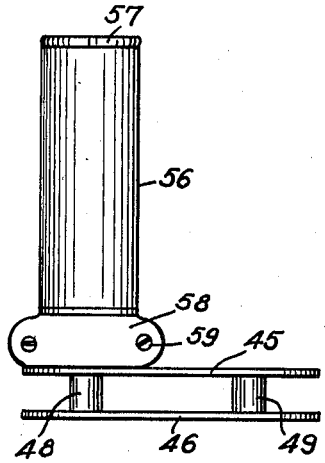
Figure 5 is an enlarged fragmentary elevation of the runner mechanism.
Figure 6:
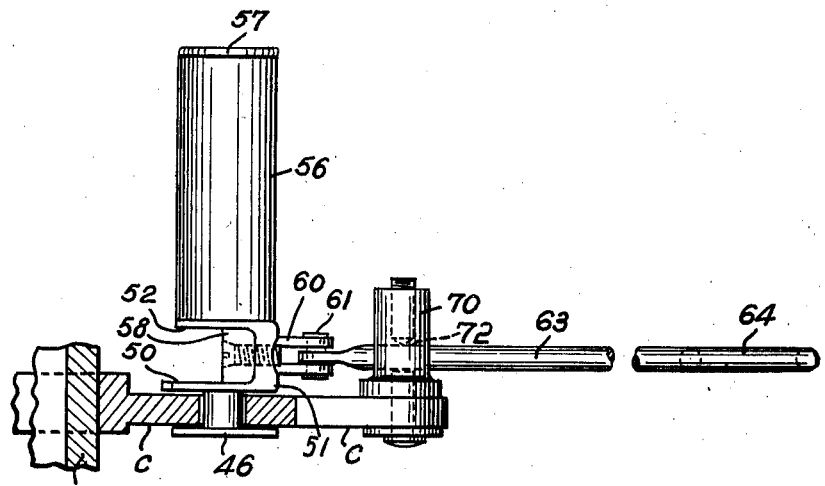
Figure 6 is an enlarged elevation of the mechanism shown in Figure 5, this time observed from a direction at right angles to that of the previous figure.

The lever 63 is pulled outwards and the slider D caused to run from inoperative position shown in Figure 1 along the slot 31 (from left to right in the case of the right-hand spindles, to braking position, Figure 3). This movement of the slider D and the associated roller 56 moves the tape E away from the whorl of the spindle. When the slider D nears the right-hand end of the slot its leading guide 49 may be moved into the terminal 35 by inward movement of the lever 63. In this position ("braking" position) indicated in Figure 3, the tape bears against the roller 56 thus pressing it inwards and pressing the lining 58 against the lower flange 14 of the spindle so as to exert a braking action. The tape is left thoroughly free to continue moving since it is running freely about the roller 56 and so there is no braking action on the tape, although good braking action is exerted on the spindle. The speed of the other spindles thus remains unchanged. A conventional tape tensioning device, for instance, resilient weighting means, (not shown) allows the tape to alter its path without material increase in tension on the tape.

When it is desired to remove the spindle, on cessation of its rotation, it is merely necessary to move the runner so that the leading guide 49 moves into the terminal 36. This is easily accomplished by appropriate movement of the lever 63. The angle of the terminal 36 is such that the resultant force of the tape pulling on the roll 56 retains the runner in this position. With the runner in this position, the arm 52 is clear of the lower flange of the spindle and the latter can be lifted vertically from its base in the usual manner.

It is seen that the slot 31 constitutes a guideway so directioned that the runner is guided from "inoperative" position to a series of operative positions in all of which the tape is retained away from the spindle, in one of which a braking effect is exerted on the spindle by the brake on the runner, and in another of which the runner is retained away from the spindle whereby the latter can be removed. The movement of the runner is conveniently controlled remotely by the lever or plunger mechanism described. At no time is there any significant retarding influence on the tape.

Advantages

The advantages of this device will be readily apparent. For instance, any spindle of the four driven by the same tape can be stopped without interferring with the drive to the others. Any spindle can be removed without stopping or retarding the others.

It will be understood that, without departing from the spirit of the invention or the scope of the claims, various modifications may be made in the specific expedients described. The latter are illustrative only and not offered in a restricting sense, it being desired that only such limitations shall be placed thereon as may be required by the state of the prior art.

The sub-titles used throughout the specification are merely to simplify reference thereto and should otherwise be disregarded.

I claim:

1. A tape removal device for spindles, comprising in combination, a plate having a clamp adapted to be mounted on the base of a spindle, a slot in said plate constituting a guideway, a runner adapted to run in said slot, a vertical tape guiding member mounted on said runner, a brake lining on said runner, an upstanding rotatable stud mounted on said plate, a lever arm mounted on said plate at a point remote from said slot, a lever arm having one end connected to said runner and being slidably retained by said stud, outward movement of said lever causing movement of said runner along said slot, said slot ending in a pair of terminals one of which extends inwardly towards the spindle, the other extending outwardly away from the spindle, said slot being so directioned whereby movement of said runner therealong causes engagement of said guiding member with said tape and continued movement of said runner into said inward terminal causes engagement of said brake lining with the spindle, in said latter position said tape causing inward pressure of said brake lining on said spindle, said outward terminal being so directioned whereby when said runner is therein the guiding member retains the tape away from said spindle in a position that the spindle may be removed from its base.

2. A tape removal device for spindles, comprising in combination, a substantially horizontal bracket mountable on a spindle base, a substantially vertical rotatable stud on said bracket, an elongated plunger held by said stud for plunging movement in relation thereto in a substantially horizontal plane, a member on the end of said plunger, a tape guiding element on said member for engaging the tape and means for guiding said member into position on movement of said member by said plunger, to remove said tape from the spindle a portion of said plunger being remote from said tape in a convenient position for manipulation.

3. A tape removal device for a spindle driven by a tape, comprising in combination, a support adapted to be mounted adjacent a spindle, a shifting member, a guide on said shifting member for engaging the spindle driving tape, said shifting member being adapted to be moved to positions in which said guide acts on said tape to remove it from the spindle, braking means connected to said shifting means active in one of said removal positions to brake the spindle and means for operating said shifting means.

4. A device, as claimed in claim 3, wherein the tape exerts pressure on said roller in said removal position whereby to cause the braking means to act on said spindle.

5. A tape removal device for spindles, comprising in combination, a substantially horizontal platform adapted to be mounted adjacent a spindle, a substantially horizontal guideway extending across said platform, a runner adapted to follow said guideway, a tape-guiding member on said runner adapted to engage the spindle tape and remove it from the spindle, said guideway being so directed that movement of the runner therealong causes movement of the guiding member outwards in respect to the spindle whereby the spindle tape is removed therefrom, a rotatable vertical stud on said platform at a point remote from said guideway, a plunger connected to said stud for slideable movement in relation thereto, one end of said plunger being connected to said runner whereby movement of the plunger relative to the stud causes movement of the runner along the guideway, said guideway and stud being so positioned that when the runner is in the operative position the plunger has an elongated portion extending beyond said stud on the side remote from said runner whereby leverage may be exerted by said plunger against the tension of said tape.

6. A tape removal device for spindles, comprising in combination, a bracket adapted to be mounted adjacent a spindle, a guideway in said bracket, said guideway having a terminal, a runner adapted to follow said guideway, an upstanding tape-guiding member on said runner adapted to engage the spindle-driving tape, said runner also having a brake, said guideway being directioned to guide the runner whereby the runner moves from an inoperative position inside said tape to said terminal in which position the guiding member engages said tape and removes it from the spindle and said brake frictionally engages the spindle, and means for moving said runner along said guideway.

7. A tape removal device for spindles, comprising in combination, a bracket adapted to be mounted adjacent a spindle, a guideway in said bracket, said guideway having a terminal, a runner adapted to follow said guideway, an upstanding tape-guiding member on said runner adapted to engage the driving tape of the spindle, said runner also having a brake, said guideway being directioned to guide the runner whereby the runner moves from an inoperative position inside said tape to said terminal in which position the guiding member engages said tape and removes it from the spindle and said brake frictionally engages the spindle, the guideway also including a second terminal extending outwardly from the spindle, said second terminal being directioned in such a manner that when the runner is in said second terminal the guiding member retains the tape away from the spindle and the runner is in a position permitting said spindle to be removed, and means for moving said runner along said guideway.

LIONEL PROVENCHER.